Figure 1:
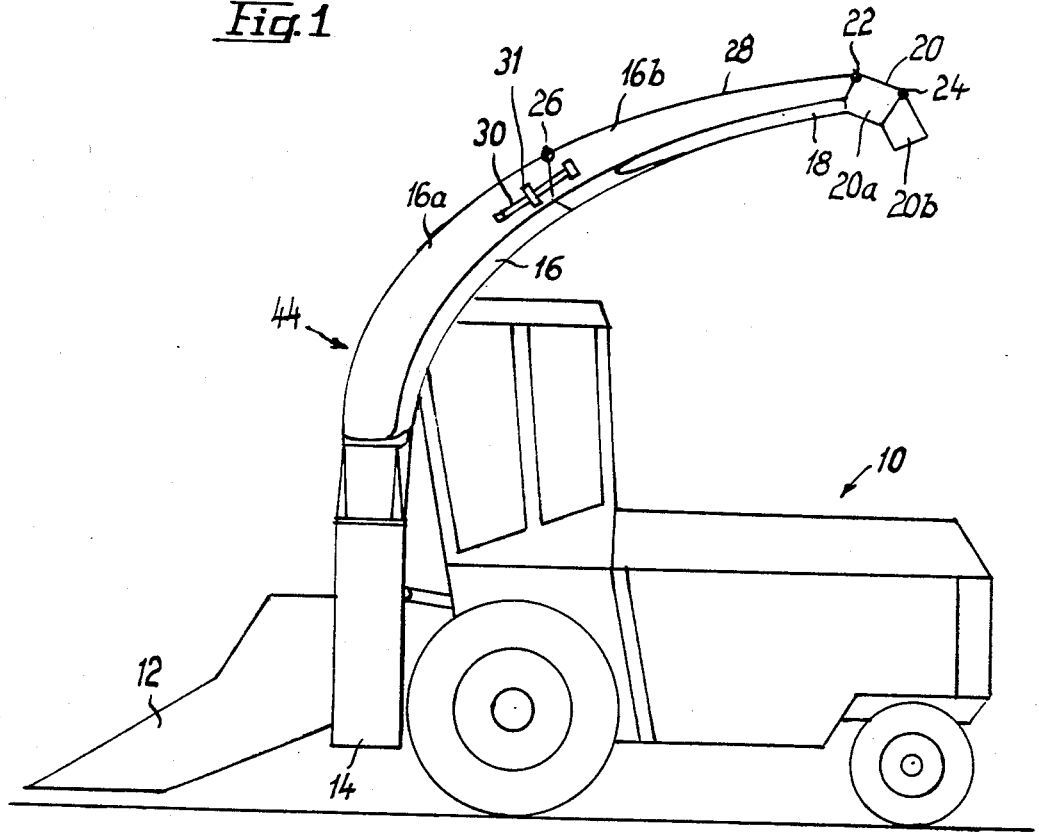

United States Patent [19]

Streicher

[11] Patent Number: 4,830,288
[45] Date of Patent: May 16, 1989

[54] FORAGE HARVESTER

[76] Inventor: Josef Streicher, Blumenstrasse 5, D-8029 Sauerlach-Lochhofen, Fed. Rep. of Germany

[21] Appl. No.: 130,459
[22] PCT Filed: Feb. 17, 1987
[86] PCT No.: PCT/DE87/00055
   § 371 Date: Oct. 16, 1987
   § 102(e) Date: Oct. 16, 1987
[87] PCT Pub. No.: WO87/04895
   PCT Pub. Date: Aug. 27, 1987

[30] Foreign Application Priority Data

Feb. 17, 1986 [DE] Fed. Rep. of Germany ....... 3604987

[51] Int. Cl.$^4$ ............................................. B02C 18/22
[52] U.S. Cl. .................................. 241/40; 241/101.7; 241/152 A
[58] Field of Search ................ 241/101.7, 222, 152 A, 241/40, 5, 152 R

[56] References Cited

U.S. PATENT DOCUMENTS 3,464,471 9/1969 Todd .
4,617,786 10/1986 Fell et al. ..................... 241/101.7 X
4,718,612 1/1988 Zweegers ..................... 241/101.7 X

FOREIGN PATENT DOCUMENTS 1086082 7/1960 Fed. Rep. of Germany .
1820567 10/1960 Fed. Rep. of Germany .
3313673 10/1984 Fed. Rep. of Germany .
2539950 1/1984 France .
534471 4/1973 Switzerland .

Primary Examiner—Mark Rosenbaum
Attorney, Agent, or Firm—Collard, Roe & Galgano

[57] ABSTRACT

A forage harvester (10) with a pick-up device (12) for the material to be chopped, and, connected to a chopping and/or conveying equipment, a delivery tube (16) with a delivery opening (18), possesses a re-comminuting device (32), comprising more than one group (42a–42c) of profiles (34) with gaps (38) positioned in the impact area of the material accelerated or to be accelerated by the chopping and/or conveying equipment in such a way that the gaps (38) of each group (42a–42c) issue at the end of each group (42a–42c) lying approximately in the direction of delivery, and the profiles of the following group (42b–42c) are offset so that the outlets of the gaps (38) each face a profile (34) of the following group (42b–42c).

25 Claims, 2 Drawing Sheets

FORAGE HARVESTER

This invention concerns a forage harvester with a device for picking up the material to be chopped, and, connected to a chopping and/or conveying equipment, a delivery tube with delivery opening, as well as a re-comminuting device.

The function of this re-comminuting device is to comminute components of the material being chopped, which have gone through the chopping process without the desired comminution, afterwards before delivery. For example, in harvesting maize silage, the ejected chopped material should no longer contain any whole grains of maize.

Various kinds of re-comminuting device are known; these, however, do not, for different reasons, meet all requirements-whether it be because the degree of comminution is unsatisfactory, or because the degree of comminution is good but the construction effort or the energy requirement is too large, or the re-mincing device becomes ineffective due to dlogging after a relatively short period of operation, and in some cases can only be cleaned inconveniently or incompletely.

From DE-U 77 23 116, a re-comminuting device especially for grains of maize is known, which is mounted in the chopper housing on its retaining wall, with the plate-shaped grinding surface acting together with strip-shaped counterpart tools. A large number of similar solutions with non-driven comminution tools provide only a small degree of comminution, just like the device according to DE-U 77 23 116; while designs with driven comminution tools, such as crushing rollers, permit a good degree of comminution of the grains, but involve considerable constructive effort, show a risk of clogging and a large energy requirement, and crush all the chopped material, thus also destroying the fodder structure of the stalks and husks. If the forage harvester is not self propelled, it can only be operated in conjunctin with a tractor having a very powerful engine, because of the high energy requirement.

From DE-U 85 16 714, a forage harvester is known that has a re-comminuting arrangement in a bulge in the chopper housing, which only the grains of maize reach, after an intentional separationafter the chopping process. Since the chopped material is extensively mixed, particularly for high rates of throughput, pieces of stalk get into the re-comminuting device, where their structure is destroyed by the crushing roller, and their residues can accumulate to such an extent on the crushing roller that the grains are no longer crushed, due to the elasticity of these residues.

The object of this invention is to design a forage harvester of the kind mentioned at the beginning so that it possesses a re-comminuting device that is simple to build and safe from clogging, that does not have a negative effect on the forage harvester's energy requirements, and that allows an optimum comminution of the grains, while preserving the chopped structure of the other chopped material to a great extent.

This object is acheived in the forage harvester mentioned at the beginning by having the re-comminuting device consist of more than one group of profiles, arranged with gaps in such a way in the impact area of the material accelerated or to be accelerated by the chopping and/or conveying equipment, that the gaps of each group issue at the end of each group positioned approximately in the direction of delivery, and the profiles of each group are offset with respect to the profiles of the following group in such a way that the outlets of the gaps each face aprofile of the following group.

The comminution of maize grains, for example, occurs upon the impact of the profiles and the grains, without a counterpart tool allocated to the profiles being necessary, which would cause an additional energy requirement for performing a crushing or grinding action. The fact that the gaps issue in the direction of delivery creates a self-cleaning effect, since no residues can accumulate and jam in the gaps. Furthermore, stalks and the like are not retained in the vicinity of the re-comminuting device or crushed. Grains which may happen to pass one group of profiles uncomminuted, strike one of the profiles of the next group, due to the staggered arrangement of the gaps and profiles, and are comminuted by this, so that an optimum degree of comminution is achieved.

It is preferred that the profiles take the shape of strips raised above a base surface.

A particulary advantageous form consists of each following group being recessed with respect to the preceding group, forming a step running transversely to the direction of delivery, with, according to another suitable embodiment, the individual groups being arranged to ascend in the direction of delivery to form the steps.

It is preferred that the apexes of the profiles be narrower than their feet; the apexes may also be blade-shaped. And the base of the gap should be flattened or rounded so as to prevent residues jamming at the bottom of the gap.

To promote self-cleaning, the gap may expand in the direction of delivery so that the profiles radiate apart.

It is practical to locate at least the profiles of one group on a common base plate. It is preferred to join the succeeding groups into a re-comminuting unit on one common base plate.

According to another suitable embodiment, the profiles are located on the circumference of a roller, which is mounted so that it can rotate on a horizontal axle, transverse to the direction of delivery. It is preferred that the axle of the roller be in the region of the outer-with respect to the radius of curvature—wall of the delivery tube. The roller may turn freely or be driven so that the surface of the roller facing the delivery cross-section of the delivery tube is moved in the opposite direction to that of delivery.

For a forage harvester with a curved delivery tube to reflect the direction of delivery, a particularly preferred embodiment has the re-comminuting device located at the outer—with respect to the radius of curvature-wall of the delivery tube, in the section following the beginning of the deflection of the direction of delivery. It is preferred that the re-comminuting device be located in the region of the delivery opening, since this provides a particulary long path for the chopped material from the chopping equipment to the recomminuting device, and thus an optimum separation of the chopped material. In this way, with maize, for example, the grains, being heavier than the stalks and husks, move outwards in the curved delivery tube, under the influence of centrifugal force, and strike the re-comminuting device, while the lighter, more elastic parts of the plant are mainly conveyed in the inner-with respect to the radius—region. Thus the grains strike the profiles of the recomminuting device unimpeded and undamped by elastic plant parts, tear and fragment, while the light components of the fodder retain their structure.

According to another practical embodiment, the re-comminuting device can swivel about a horizontal axis transverse to the direction of delivery, thus making the angle of impact adjustable on the one hand, and making it possible to swivel the re-comminuting device into an inactive position when its effect is not desired or necessary, such as for grass or green maize, on the other. As an alternative, the re-comminuting device may be arranged so that it can be slid in and out through a hole in the outer wall of the delivery tube.

If the discharge end of the delivery tube is fitted with an adjustable deflecting flap, the re-comminuting device can be located on the deflecting flap, and adjustable with it.

In order to promote separation of the chopped material, the downstream section of the delivery tube can be arranged to be adjustable about a hinge with a horizontal axis, mounted on the outer wall of the delivery tube. In this way, the distance of throw can also be altered.

The invention is explained in further detail by way of the following description of the sample embodiments illustrated in the drawing.

Figure 2:
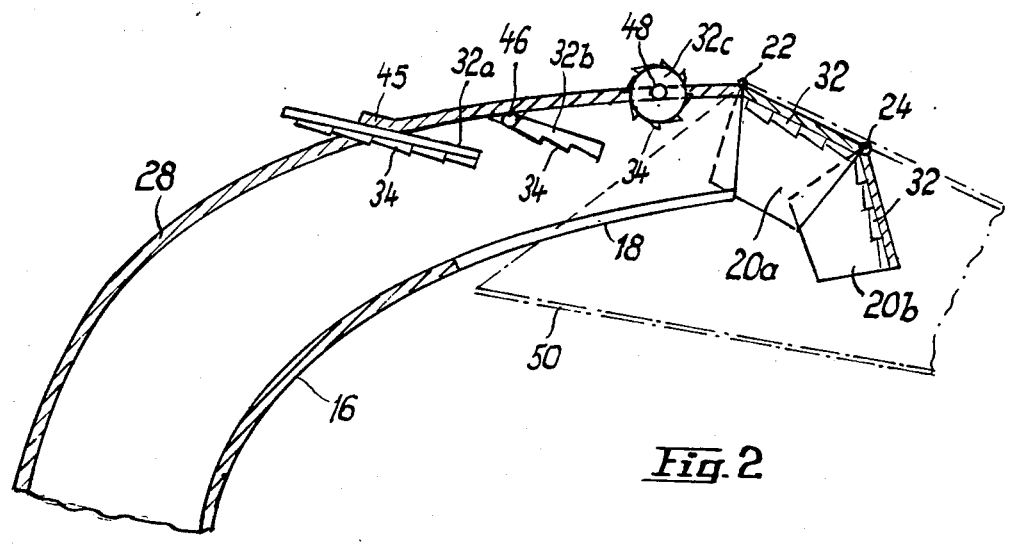
Figure 3:
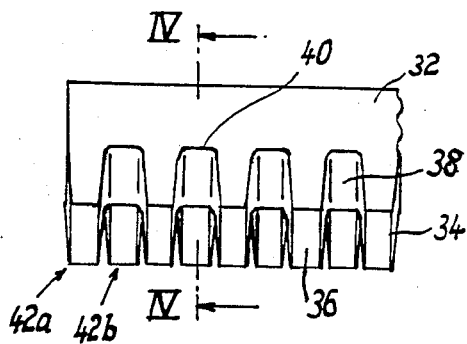
Figure 4:
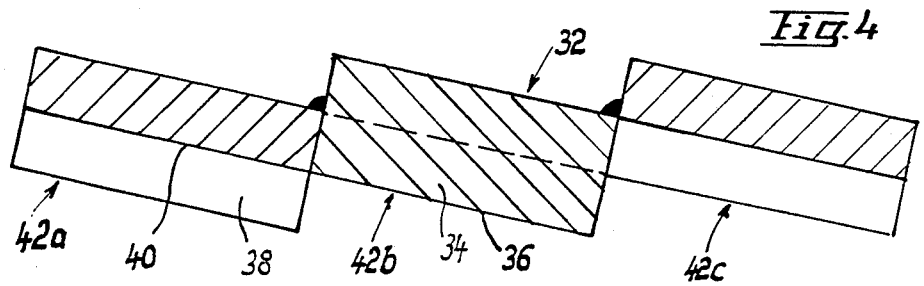
Figure 5:
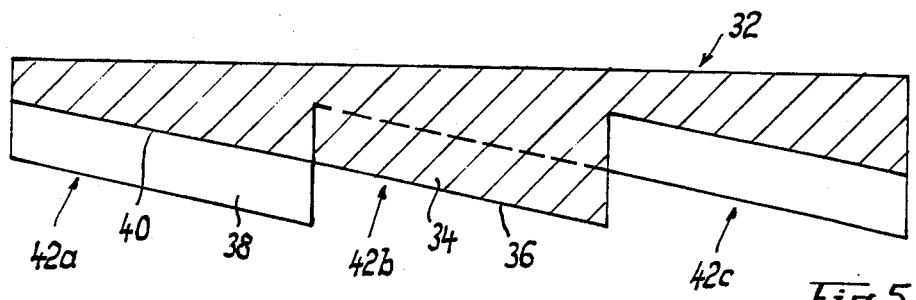
Figure 6:
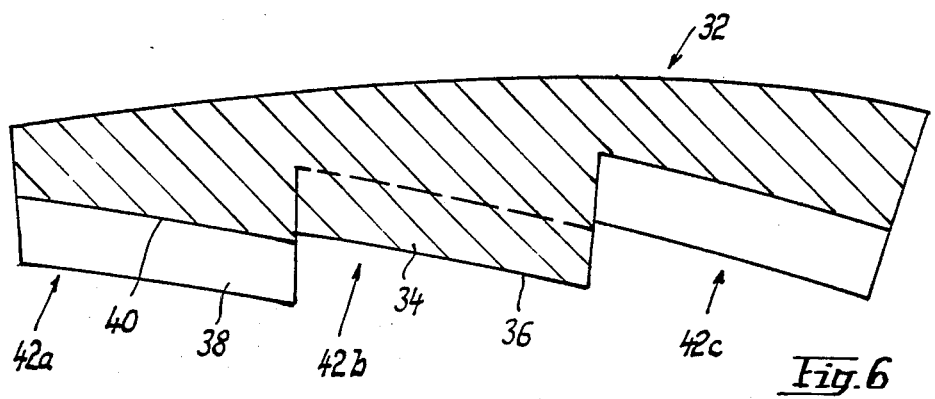

It shows:

FIG. 1 A schematic side view of a forage harvester designed according to this invention, whose downstream section is shown in two different positions, FIG. 2 A section through a part of the delivery tube, with various versions of the positioning of the re-comminuting device, FIG. 3 A front view of part of a re-comminuting device, partially cut away, FIG. 4 A section through line IV—IV in FIG. 3., FIG. 5 A section similar to FIG. 4 through a welded embodiment of a a recomminuting device, and FIG. 6 A curved embodiment of a re-comminuting device.

A forage harvester constructed as a disc-type forage harvester 10, for example, is fitted with an attachment 12, in this case a maize pick-up unit, and consists in the main of a chopper housing 14 with rotating cutting and ejecting implements in it, and the attached delivery tube 16. The delivery tube 16 is curved, and is provided with a delivery opening 18 at its end. At the end of delivery tube 16, an adjustable discharge flap, designated as a whole by 20; this is connected to delivery tube 16 in a manner adjustable about a horizontal shaft 22 running transversely to the direction of delivery, and itself consists of two sections, 20a and 20b, adjustable with respect to one another about an shaft 24 parallel to shaft 22.

The delivery tube 16 is divided into two sections, 16a and 16b, which are connected by a horizontal shaft running transversely to the direction of delivery, that is located in the outer-with respect to the radius of curvature—wall 28 of the delivery tube 16. This permits the distance of throw and the separation of the chopped material in flight to be influenced by the delivery tube. In order to adjust section 16b with respect to 16a, the section connected to the chopper housing 14, a screw spindle 30, sketched here, is provided, which is supported on the one hand on section 16a by a nut 31, and on the other on section 16b.

At least one re-comminuting device is located in the impact area of the chopped material accelerated by the chopping or ejecting implements, at which comminuting forces are obtained from the kinetic energy by the impact; these take effect to comminute the grains still present in the chopped material, in particular.

One embodiment of a re-comminuting device 32 is illustrated in FIG. 3, where the view is in the direction of delivery, towards the device 32. The recomminuting device 32 consists of rib-like profiles 34, spaced apart and running in the direction of delivery, and rising somewhat in the direction of delivery, so that their apexes 36 protrude into the path of the chopped material. The profiles 34 can vary from the cross-section illustrated, and be blade-shaped or knife-like, for example. The apexes 36 may also be toothed, for example with a sawtoothed shaped, or the knife-like profiles may have a scalloped edge. A sufficient distance between the profiles is important, with the gap 38 between the individual profiles 34 having a flattened or rounded bottom 40, so that no residues can jam up in this gap.

As can be sen in FIG. 3 already, and is shown more clearly in FIGS. 4 to 6, a first group, 42a, of profiles 34 is followed by further groups, for example two further groups, 42b and 42c, with the groups being offset with respect to one another so that a profile 34 of a succeeding group is always aligned with a gap of the preceding group. In this way, the parts that do not strike a profile 34, but rather a gap 38, in the first group, 42a, are also comminuted.

A further possible arrangement not illustrated consists of the spacing of the profiles within the individual groups growing larger in the direction of delivery, so that a radial overall arrangementof the profiles 34 results. this promotes, in particular, the self-cleaning effect under the influence of the chopped material passing through the gaps 38.

The individual groups 42a to 42c are stepped in such a way that the profiles 34 of each group always ascend from the same level as the profiles of the first group, 42a. Through the stepped arrangement, the self-cleaning by the gaps 38 of the residues collecting therein is favored considerably, because the gaps 38 issue freely in the direction of delivery, without a facing hindrance that impairs the ejection of the residues.

The individual groups, 42a and 42c, can be fabricated separately, and then the desired number can be welded together into a recomminuting device 32, as is shown in FIG. 4. But re-comminuting devices 32 may also be fabricated in one piece with the desired number of groups, e.g. cast or milled, as shown in FIG. 5. In order to permit the re-comminuting devide, 32, to be matched to the curve of the wall 28 along the length of delivery tube 16, the re-comminuting device 32 itself can be arched in the direction of delivery, as shown in FIG. 6. Yet another possibility consists in mounting the individual groups, 42a to 42c, removably on a common base plate to form a re-comminuting device, so that, depending on the type of chopped material, the positioning of the re-comminuting device, or similar criteria, the most favorable number of profile groups, or the most favorable profile shape, can be selected.

For locating the re-comminuting device 32 in the delivery tube 16, the entire area beginning at the start of the curvature at 44(FIG. 1) is possible.

In the simplest case, the plate-shaped re-comminuting device 32 is connected rigidly to the radially outer wall 28 of the delivery tube 16, or the corresponding wall of sections 20a or 20b of the discharge flap 20. This possibility of fastening is illustrated in FIG. 2 in the area of these sections 20a and 20b.

Another possibility consists of letting the re-comminuting device 32 protrude obliquely, at an angle that is favorable for the impact effect, from the radially outer wall 28 into the interior of the delivery tube 16, as is shown in the example of a plate-shaped re-comminuting device 32a, which can also slide lengthwise in a guideway 45 formed in the wall 28, so that the re-comminuting device 32 can, if necessary, be withdrawn into an inactive position, if this is desired when chopping grass or green maize, for example.

Another possible arrangement consists of arranging the re-comminuting device 32b to be adjustable about a horizontal shaft 46 transverse to the direction of delivery, which is located in the region of wall 28, so that the most favorable angle of impact can be set. The angle of impact can also be adjusted by adjusting the discharge flaps 20a or 20b, if the re-comminuting device 32 is located at that place.

A further possibility consists of designing the re-comminuting device 32c to be cylindrical, with the profiles running circumferentially about the cylinder. The stepped arrangement of the individual groups of profiles can be reatined in this case, too. The cylindrical re-comminuting device 32c is mounted on delivery tube 16 on an axle running transversely to the direction of delivery and horizontally, roughly in the area of wall 28; the steps of the profiles are chosen so that on the section of the circumference of the cylinder's surface facing the interior of delivery tube 16, the profiles rise out of the cylinder's surface in the direction of delivery of the chopped material.

The cylindrical re-comminuting device 32c may be mounted to turn freely, or on the other hand, be provided with a drive, such as an electric or hydraulic motor, whose direction of rotation is selected so that the section of the circumference of the cylinder lying within the delivery tube 16 moves in the opposite direction to the delivery motion, to reinforce the impact effect.

If very large throw distances are needed in trailed operation, which may not be achievable reliably due to re-comminuting devices positioned far upstream in delivery tube 16, an extension tube 50 can be slid onto the end of the delivery tube if necessary, which receives and transmits any parts of the chopped material which may fall out of the delivery opening 18.

The arrangement of the re-comminuting device 32 in the region of the discharge flap 20 has proven to be particularly advantageous, because the most favorable angle of impact can be set particularly simply, by adjusting sections 20a and 20b. Furthermore, the sections 20a and 20b of the discharge flap can be removed easily, for example if the effect of the re-comminuting device 32 is not needed or desired when harvesting grass or green maize.

Although the invention preferably concerns a forage harvester, because the relatively small required power for optimum comminution is especially advantageous for this, the invention is also suitable for stationary choppers.

So that the grains can be broken with the least effort, the width of the apex surfaces 36 of the profiles 34 should be less than the size of the grains. In this way, the side edges of the apex surfaces will act on the grains, as a rule.

I claim:

1. A forage harvester (10) with a pick-up device (12) for the material to be chopped, and, connected to chopping equipment (14), a delivery tube (16) with a delivery opening (18), and a re-comminuting device 32, characterized by the said re-comminuting device (32) consisting of more than one group (42a–42c) of profiles (34) located in such a manner in the impact area of the material accelerated or to be accelerated by the chopping equipment, with gaps (38), that the gaps (38) of each group (42a–42c) issue at the end of each group (42a–42c) lying approximately in the direction of delivery, and the profiles of the following group (42b–42c) being offset so that the outlets of the gaps (38) each face a profile (34) of the following group (42b–42c).

2. A forage harvester in accordance with claim 1, characterized by the profiles (34) rising strip-like above a base surface.

3. A forage harvester in accordance with claim 2, characterized by the apexes (36) of the profiles being toothed.

4. A forage harvester in accordance with claim 1, characterized by each succeeding group (42b–42c) being sunk with respect to the group preceding it (42a–42b), and forming a step transverse to the direction of delivery.

5. A forage harvester in accordance with claim 4, characterized by the individual groups being positioned to ascend in the direction of delivery, in order to form the steps.

6. A forage harvester in accordance with claim 1, characterized by the apexes (36) of the profiles being narrower than their feet.

7. A forage harvester in accordance with claim 6, characterized by the apexes being blade-shaped.

8. A forage harvester in accordance with claim 1, characterized by the width of the apex (36) of the profiles (34) being smaller than the grain size of the grains to be broken by the re-comminuting device (32).

9. A forage harvester in accordance with claim 6, characterized by the blade-shaped apex being scallped.

10. A forage harvester in accordance with claim 1, characterized by the bottom (40) of the gaps (38) being flattened.

11. A forage harvester in accordance with claim 1, characterized by the bottom of the gaps being rounded out.

12. A forage harvester in accordance with one claim 1, characterized by the gaps expanding in the direction of delivery in such a way that the profiles radiate apart.

13. A forage harvester in accordance with claim 1, characterized by at least the profiles (34) of one group (42a–42c) being located on a common base plate.

14. A forage harvester in accordance with claim 1, characterized by the succeeding groups (42a–42c) being grouped into a re-comminuting unit on a common base plate.

15. A forage harvester in accordance with claim 1, characterized by the profiles being attached to the circumference of a cylinder (32c), which is mounted so that it can turn on a horizontal axle (48) positioned transversely to the direction of delivery.

16. A forage harvester in accordance with claim 15, characterized by the axle (48) of the cylinder (32c) being located in the region of the outer, with respect to the radius of curvature, wall (28) of the delivery tube (16).

17. A forage harvester in accordance with claim 15, characterized by the cylinder (32c) being mounted so that it can turn freely.

18. A forage harvester in accordance with claim 15, characterized by the cylinder (32c) being driven so that the cylinder surface facing the delivery cross-section of the delivery tube (16) is moved in the opposite direction to that of the delivery.

19. A forage harvester in accordance with claim 1, with a curved delivery tube (16) to deflect the direction of delivery, characterized by the re-comminuting device (32) being located on the outer, with respect to the radius of curvature, wall (28) of the delivery tube (16), in the section (46) following the beginning (44) of the deflection of the delivery direction.

20. A forage harvester in accordance with claim 19, characterized by the recomminuting device (32) being located in the region of the delivery opening (18).

21. A forage harvester in accordance with claim 19, characterized by the re-comminuting device (32b) swivelling about a horizontal shaft (46) running transversely to the direction of delivery.

22. A forage harvester in accordance with claim 19, characterized by the re-comminuting device (32a) being arranged so that it can slide in and out through an opening in the outer wall (28) of the delivery tube (16).

23. A forage harvester in accordance with claim 19, and a deflecting flap (20) located at the discharge end of the delivery tube (16), characterized by the re-comminuting device (32) being located on the deflecting flap (20) and being adjustable with the said flap.

24. A forage harvester in accordance with claim 23, characterized by the deflecting flap consisting of two sections (20a, 20b), adjustable with respect to one another about a horizontal shaft (24) running transversely to the direction of delivery, and each section being provided with a re-comminuting device on its radially outer wall.

25. A forage harvester in accordance with claim 1, characterized by the delivery tube (16) being divided into two successive sections (16a, 16b), of which the downstream section (16b) is adjustable with respect to the other section (16a) about a hinge (26) with a horizontal shaft, fastened to the outer wall (28).

* * * * *